US 9,488,502 B2

(12) United States Patent
Chen et al.

(10) Patent No.: US 9,488,502 B2
(45) Date of Patent: Nov. 8, 2016

(54) OPTICAL ENCODER HAVING A POSITIONING DEVICE WITH LIGHT PENETRATING AREAS DISPOSED BETWEEN A LIGHT EMITTING MODULE AND A LIGHT SEPARATING STRUCTURE

(71) Applicant: Industrial Technology Research Institute, Hsinchu (TW)

(72) Inventors: Ching-Chang Chen, Kaohsiung (TW); Yi-Cheng Chen, New Taipei (TW); Ming-Chieh Chou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 148 days.

(21) Appl. No.: 14/621,406

(22) Filed: Feb. 13, 2015

(65) Prior Publication Data

US 2016/0146640 A1   May 26, 2016

(30) Foreign Application Priority Data

Nov. 21, 2014 (TW) .............. 103140453 A

(51) Int. Cl.
*G01D 5/347* (2006.01)

(52) U.S. Cl.
CPC ........ *G01D 5/3473* (2013.01); *G01D 5/34715* (2013.01)

(58) Field of Classification Search
CPC ........... G01D 5/3473; G01D 5/34715; G01D 5/34707
See application file for complete search history.

(56) References Cited

U.S. PATENT DOCUMENTS

| 4,979,827 | A | * | 12/1990 | Matsui ..................... G01D 5/38 250/237 G |
| 6,664,538 | B1 | | 12/2003 | Farnsworth et al. |

(Continued)

FOREIGN PATENT DOCUMENTS

| CN | 1975340 | 5/2010 |
| TW | 201009303 | 3/2010 |

(Continued)

OTHER PUBLICATIONS

Lihui Liang, et al., "The Design of Composite Optical Encoder," 2009. ICEMI '09. 9th International Conference on Electronic Measurement & Instruments, Aug. 16-19, 2009, pp. 2-642-2-645.
V. Mayer, et al., "New High Resolution Optical Incremental Rotary Encoder," 2008 2nd European Conference & Exhibition on Integration Issues of Miniaturized Systems—MOMS, MOEMS, ICS and Electronic Components (SSI), Apr. 9-10, 2008, pp. 1-8.

(Continued)

*Primary Examiner* — Que T Le
(74) *Attorney, Agent, or Firm* — Jianq Chyun IP Office

(57) ABSTRACT

An optical encoder includes a light emitting module, a positioning device and a light separating structure. The light emitting module emits a light beam illuminating an illumination area of the positioning device. The positioning device includes light penetrating areas arranged in a dislocation manner. The light penetrating areas sequentially move into the illumination area. The light separating structure is disposed in the path of the light beam. The positioning device is disposed between the light emitting module and the light separating structure. When part of the light beam penetrates one of these light penetrating areas and is transmitted to the light separating structure, the light separating structure transmits the light to a sensing area and forms at least one first positioning optical pattern. The distance between two first positioning optical patterns formed by two adjacent light penetrating areas is greater than the pitch between the two adjacent light penetrating areas.

20 Claims, 7 Drawing Sheets

(56) References Cited

U.S. PATENT DOCUMENTS

| | | |
|---|---|---|
| 6,958,469 B2 | 10/2005 | Ishizuka |
| 7,145,126 B2 | 12/2006 | Lee |
| 7,166,833 B2 | 1/2007 | Smith |
| 7,482,575 B2 | 1/2009 | Sidor et al. |
| 7,619,208 B2 | 11/2009 | Masada et al. |
| 7,825,368 B2 | 11/2010 | Kusano |
| 8,148,674 B2 | 4/2012 | Yoshida et al. |
| 8,328,375 B2 | 12/2012 | Diekmann et al. |
| 2008/0042051 A1 | 2/2008 | Sidor et al. |
| 2010/0157585 A1 | 6/2010 | Diekmann et al. |

FOREIGN PATENT DOCUMENTS

| | | |
|---|---|---|
| TW | I354775 | 12/2011 |
| TW | 201305536 | 2/2013 |

OTHER PUBLICATIONS

Kai Engelhardt, et al., "Absolute, high-resolution optical position encoder," Applied Optics, vol. 35, No. 1, Jan. 1, 1996, pp. 201-208.

Ching-Fen Kao, et al., "Optical encoder based on the fractional Talbot effect," Optics Communications, vol. 250, Issues 1-3, Jun. 1, 2005, pp. 16-23.

G.. Voirin, et al., "Performance of Interferometric Rotation Encoders Using Diffraction Gratings," Proc. SPIE 3099, Micro-optical Technologies for Measurement, Sensors, and Microsystems II and Optical Fiber Sensor Technologies and Applications, Sep. 24, 1997, pp. 166-175.

Office Action of Taiwan Counterpart Application, issued on Dec. 23, 2015, p. 1-p. 7, in which the listed references were cited.

\* cited by examiner

OPTICAL ENCODER HAVING A POSITIONING DEVICE WITH LIGHT PENETRATING AREAS DISPOSED BETWEEN A LIGHT EMITTING MODULE AND A LIGHT SEPARATING STRUCTURE

CROSS-REFERENCE TO RELATED APPLICATION

This application claims the priority benefit of Taiwan application serial no. 103140453, filed on Nov. 21, 2014. The entirety of the above-mentioned patent application is hereby incorporated by reference herein and made a part of this specification.

TECHNICAL FIELD

The technical field relates to an optical encoder.

BACKGROUND

Electronic devices and mechanical devices currently available will for example additionally arrange an optical encoder inside a driver component of a motor as a conventional technique to accurately grasp the rotation and movement situation between individual components with respect to each other. An optical encoder includes an optical structure having particular information, a light source and a light sensor. Typically, the optical structure has a plurality of areas able to let light pass through. When the optical structure rotates, the light sensor receives a particular periodical light signal, and then the optical encoder may further determine the displacement, the angular displacement and rotation speed of the object driven by the driver component according to the light signal.

Due to the continuously increasing positioning requirements between individual components in current technology, as a result the density of the periodical area of an optical disk in current optical encoders is increasing. However, in order to analyze the light signal formed by the periodical area, the density and positioning accuracy of a sensing device are increasing as a result as well. High density and high positioning accuracy sensing devices increase the manufacturing cost and difficulty, thus limiting the highest positioning resolution determinable by an optical encoder.

SUMMARY

One of exemplary embodiments provides an optical encoder including a light emitting module, a positioning device and a light separating structure. The light emitting module emits a light beam, and the light beam illuminates an illumination area of the positioning device. The positioning device includes a plurality of light penetrating areas arranged in a dislocation manner, and the light penetrating areas sequentially move into the illumination area. The light separating structure is disposed in a transmitting path of the light beam, and the positioning device is disposed between the light emitting module and the light separating structure. When part of the light beam penetrates at least one of the light penetrating areas and is transmitted to the light separating structure, the light separating structure transmits the penetrating part of the light beam to a sensing area and forms at least one first positioning optical pattern, wherein a distance between two first positioning optical patterns formed by part of the light beam transmitted to the sensing area via two adjacent light penetrating areas is greater than a pitch between the two adjacent light penetrating areas.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
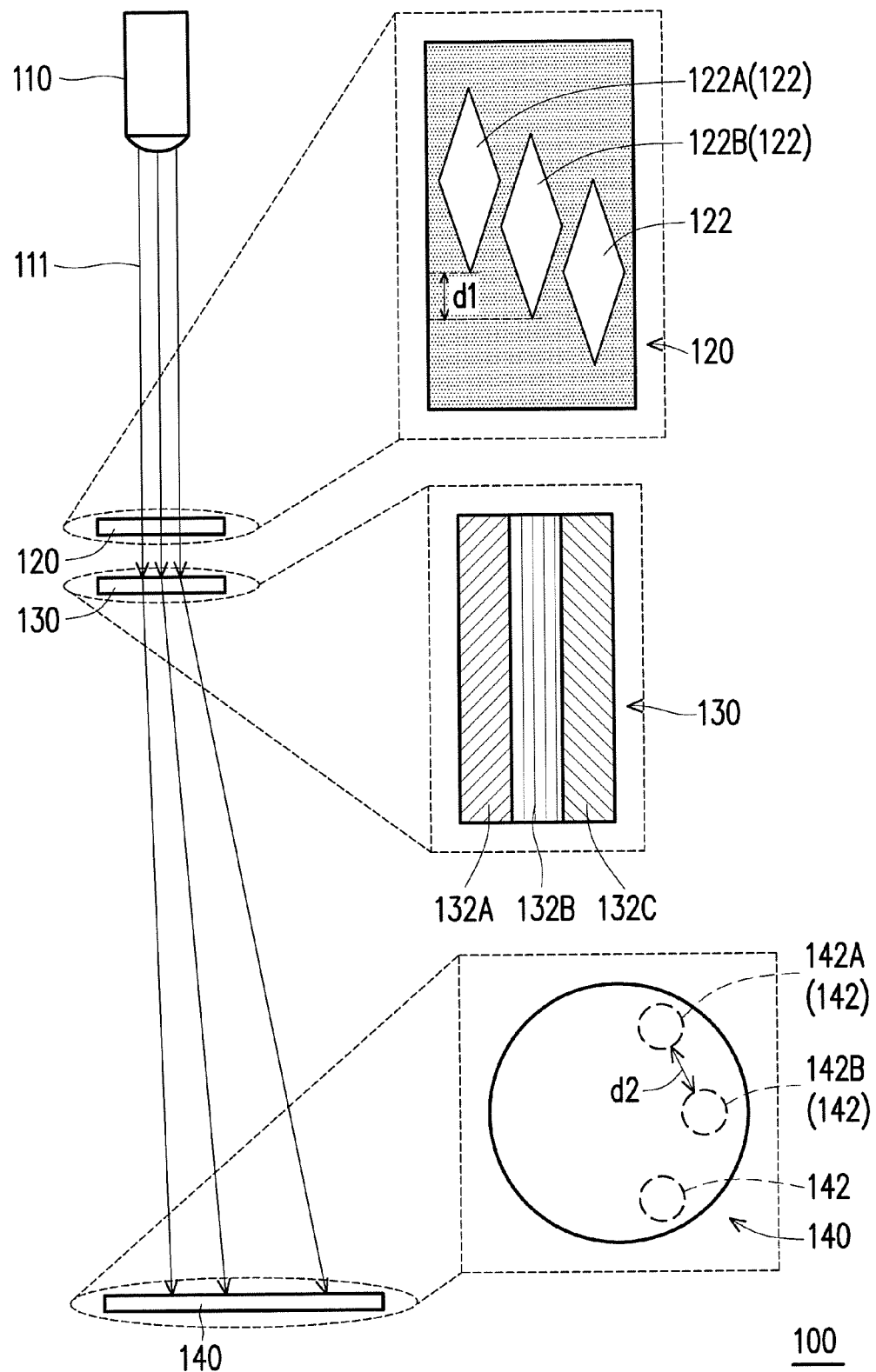
FIG. 1 is a schematic view illustrating an optical encoder and a top view illustrating a positioning device, a light separating structure and a sensing area according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
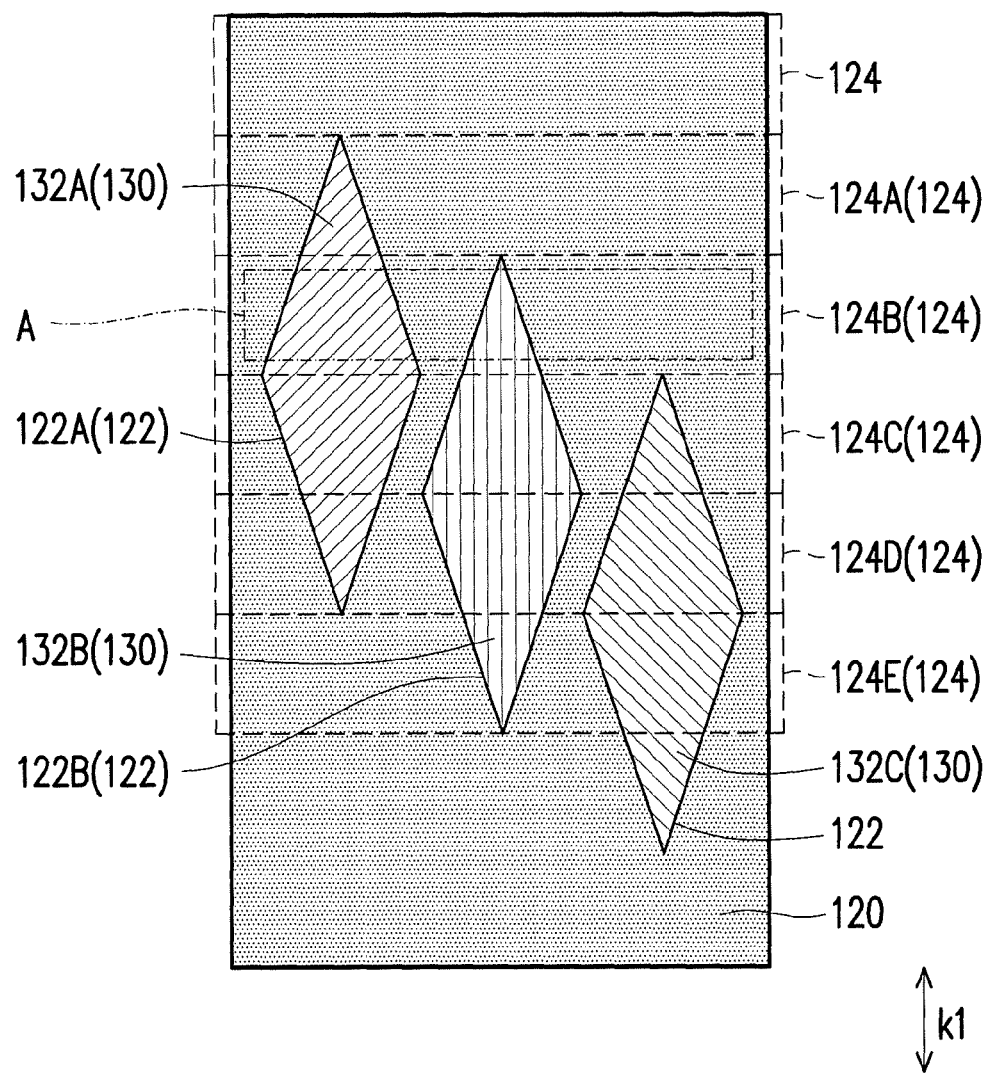
FIG. 2 is a top view illustrating a positioning device and a light separating structure according to a first embodiment of the disclosure.

FIG. 1 is a schematic view illustrating an optical encoder and a top view illustrating a positioning device, a light separating structure and a sensing area according to a first embodiment of the disclosure. FIG. 2 is a top view illustrating a positioning device and a light separating structure according to a first embodiment of the disclosure. Referring to FIG. 1 and FIG. 2, in a first embodiment of the disclosure, an optical encoder 100 includes a light emitting module 110, a positioning device 120 and a light separating structure 130. The light emitting module 110 emits a light beam 111, and an illumination area A on the positioning device 120 is illuminated by the light beam 111. The positioning device 120 includes a plurality of light penetrating areas 122 arranged in a dislocation manner, and the light penetrating areas 122 sequentially move into the illumination area A. Because the light penetrating areas 122 are arranged in a dislocation manner with respect to each other, therefore the light beam 111 penetrates the positioning device 120 changes with respect to where the position of the illumination area A is located at on the positioning device 120. More specifically, referring to FIG. 2, the positioning device 120, for example, moves along the direction k1, and the illumination area A illuminated by the light beam 111 will also move along with respect to the k1 direction of the positioning device 120. That is to say, the light beam 111 sequentially illuminates the light penetrating areas 122.

The light separating structure 130 is disposed in the path of the light beam 111, and the positioning device 120 is disposed between the light emitting module 110 and the light separating structure 130. More specifically, in the embodiment, the light separating structure 130 includes a plurality of diffraction gratings (Here for example, three diffraction gratings 132A, 132B, 132C), and the diffraction gratings 132A, 132B, 132C each include a plurality of slits arranged in parallel. The sizes of the diffraction gratings 132A, 132B, 132C are larger than or equal to the sizes of the light penetrating areas 122, and each of the light penetrating areas 122 will overlap one of the diffraction gratings 132A, 132B, 132C when the light penetrating areas are moved, and two diffraction gratings overlapped by two adjacent light penetrating areas 122 are different. That is to say, in the present embodiment, each diffraction grating 132A, 132B, 132C has the slits aligned in a different direction; therefore the light separating structure 130 may cause the parts of the light beam 111 penetrating the light penetrating areas 122 to form at least one mutually separate first positioning optical patterns 142 on the sensing area 140. More specifically, the first positioning optical patterns 142, for example, are formed by the first diffraction fringes diffractively formed by the diffraction gratings 132A, 132B, 132C, therefore the distance d2 between the first positioning optical patterns 142 (for example, the first positioning optical patterns 142A and 142B) will be larger than the pitch d1 between the light penetrating areas 122 (for example, the light penetrating areas 122A and 122B). Therefore, the light separating structure 130 on the positioning device 120 allows the parts of light beam 111 penetrating the positioning device 120 to be transmitted to the sensing area 140 in different directions, and allowing the distance between the first positioning optical patterns 142 illuminating the sensing area 140 to become larger, providing easier sensing of the first positioning optical patterns 142.

In other words, in the present embodiment, which one or which ones of the light penetrating areas 122 the illumination area A illuminated by the light beam 111 is located at is determined according to which first positioning optical pattern 142 or which first positioning optical patterns 142 appear on the sensing area 140. Therefore, when a user, for example, fixes a component to the light emitting module 110, and fixes another component to the positioning device 120, the optical encoder 100 may determine the distance and position along the k1 direction between the two components. More specifically, a user may more accurately determine the position of the illumination area A on the positioning device 120 according to the brightness of each first positioning optical pattern 142 or the proportion of the brightnesses of two first positioning optical patterns 142 appearing at the same time, further allowing the optical encoder 100 to provide even higher positioning resolution. On the other hand, because the first positioning optical pattern 142 is a diffraction fringe formed by the light beam 111 via the diffraction grating 132A, 132B, 132C, therefore the first positioning optical pattern 142 will not disappear because of foreign oil stains blocking a portion of the light penetrating area 122, so that the durability is further enhanced.

Referring to FIG. 2, in the present embodiment, the above positioning device 120 is divided into a plurality of positioning areas 124, and the positioning areas 124 sequentially move along the k1 direction into the illumination area A. Each light penetrating area 122 is disposed in at least two adjacent positioning areas 124 of the positioning areas 124, and the positioning areas 124 which two adjacent light penetrating areas 122A, 122B are disposed on are different but partially the same. More specifically, in the present embodiment, the number of the positioning areas 124 which a light penetrating area 122 is disposed on are the same. The light penetrating area 122A is disposed on the positioning areas 124A, 124B, 124C, 124D, and the light penetrating area 122B is disposed on the positioning areas 124B, 124C, 124D, 124E, that is to say, the positioning area 124A which the light penetrating area 122A is disposed on differs from the positioning areas 124B, 124C, 124D, 124E which the light penetrating area 122B is disposed on, therefore when the illumination area A is located at the positioning area 124A, the light beam 111 may penetrate through the light penetrating area 122A, and when the illumination area A is located at the positioning area 124B, then the light beam 111 may penetrate through the light penetrating areas 122A and 122B at the same time, and the above penetrating light beam 111 is further transmitted to the above sensing area 140 and produces a different combination of the first positioning optical patterns 142. That is to say, the positioning device 120 may provide different optical signals according to the positioning areas 124 by arranging the light penetrating areas 122 in a dislocation manner. On the other hand, the size of the light penetrating area 122 is greater than the size of the positioning area 124, therefore the positioning resolution may be enhanced and the manufacturing difficulty may be lowered at the same time.

The above light penetrating areas 122 in the present embodiment have similar shapes, where the light penetrating areas 122 are diamond shaped. The diamond shaped design may allow the light beam 111 entering the light penetrating area 122 to have a more evident change when moving along; however it should not be construed as a limitation to the disclosure. In other embodiments, the light penetrating areas may be a plurality of diamonds of different sizes according to different positioning requirements, and the number of positioning areas which each of the light penetrating areas is disposed on may be different from each other. In another embodiment, the light penetrating areas may have an elliptical shape, a polygonal shape or other shapes.

Below other embodiments will be detailed for explanation. Here it should be noted, in the below embodiments the same reference numbers and a portion of the contents from the previous embodiment are used, wherein the same reference numbers are used to represent same or like parts, and description of similar technical content will be omitted. Regarding the description of the omitted portions, reference may be made to the previous embodiment, and will not be repeated in the below embodiment.

Figure 3:
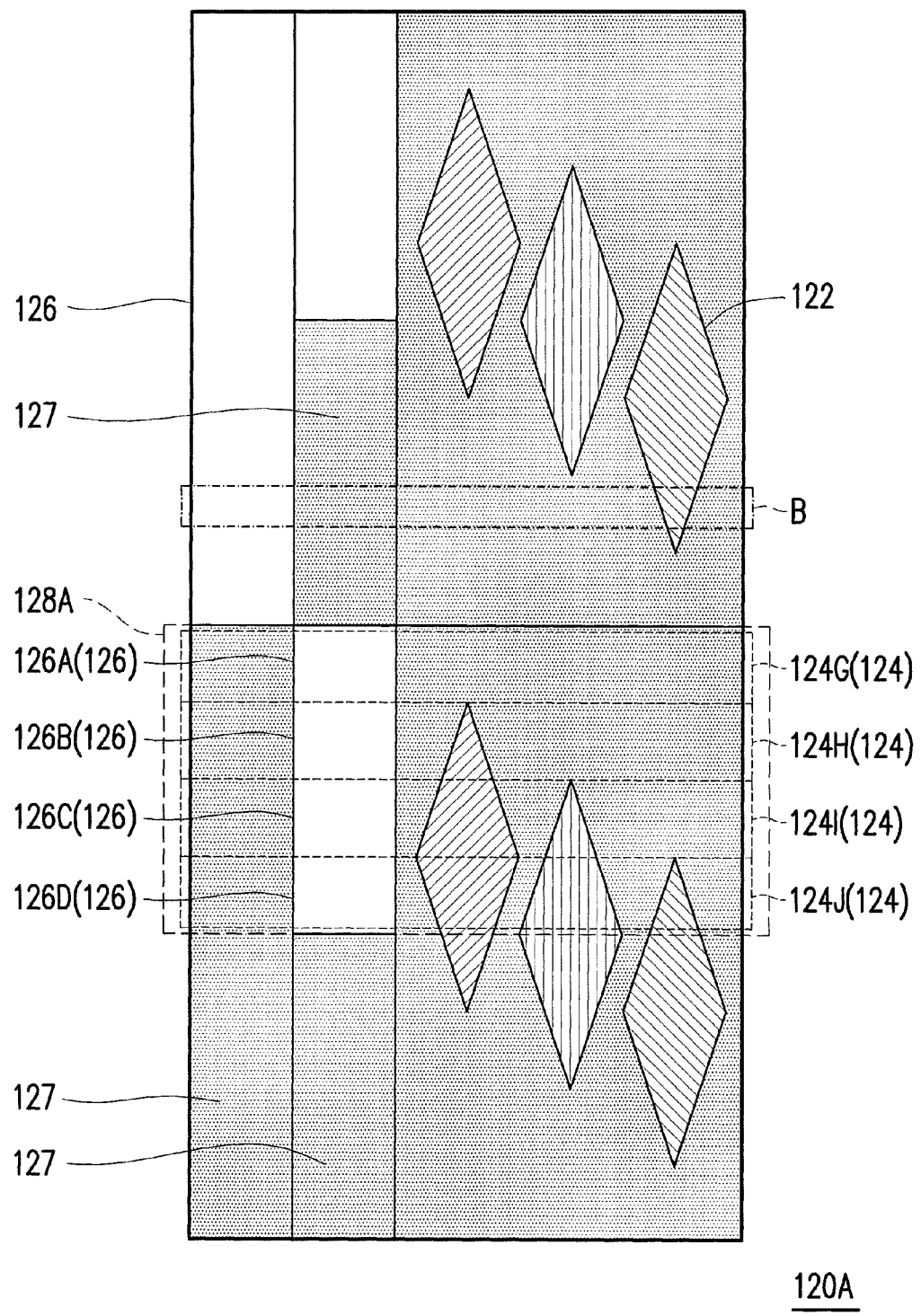
FIG. 3 is a top view illustrating a positioning device according to a second embodiment of the disclosure.

FIG. 3 is a top view illustrating a positioning device according to a second embodiment of the disclosure. Referring to FIG. 3, in the second embodiment of the disclosure, each of the positioning areas 124 of a positioning device 120A further includes a sub positioning area. For example, a positioning area 124G includes a sub positioning area 126A, a positioning area 124H includes a sub positioning area 126B, a positioning area 124I includes a sub positioning area 126C, and a positioning area 124J includes a sub positioning area 126D. The sub positioning areas 126A, 126B, 126C, 126D form a plurality of light penetrating patterns 126 and a plurality of light shielding patterns 127. The light penetrating patterns 126 and the light shielding patterns 127 respectively move along a plurality of paths to an illumination area B, and the light penetrating patterns 126 and the light shielding patterns 127 are arranged in a dislocation manner with respect to each other along the up and down direction. That is to say, the light penetrating patterns 126 and the light shielding patterns 127 are arranged in a dislocation manner with respect to each other along the extending direction of the above paths, and the other light penetrating patterns 126 and the light shielding patterns 127 are arranged in a dislocation manner in a direction perpendicular to the paths. Part of the light beam 111 penetrating the sub positioning areas 126A, 126B, 126C, 126D forms a plurality of second positioning optical patterns (not shown) directly on the sensing area 140. The second positioning optical patterns are different from each other. For example, the second positioning optical patterns are optical patterns having brightness or shadows not having brightness. More specifically, in the present embodiment, the light penetrating patterns 126 are, for example, the positioning device 120A divided into, for example, four areas the size of the area 128A, therefore when the light penetrating patterns 126 move, for example, along the up and down path to the illumination area B, then which light penetrating patterns 126 were penetrated by the light may be determined according to the above second positioning optical patterns, and the location on the positioning device 120A that the illumination area B is located at may be determined, and at the same time, arranging with the first positioning optical patterns 142 produced by the light penetrating areas 122, then which positioning area 124G, 124H, 124I, 124J the illumination area B is located on may be determined. In the present embodiment, the arrangement of the location of appearance of each of the above first positioning optical patterns 142 is different from the arrangement of the location of appearance of each of the above second positioning optical patterns. Because the first positioning optical patterns 142 are patterns via diffraction, and the second positioning optical patterns are formed by the parallel light beam shielded by the positioning device 120A, the first positioning optical pattern 142 may, for example, be arranged radially along a circular shape, and the second positioning optical patterns may for example be arranged along a straight line.

Figure 4:
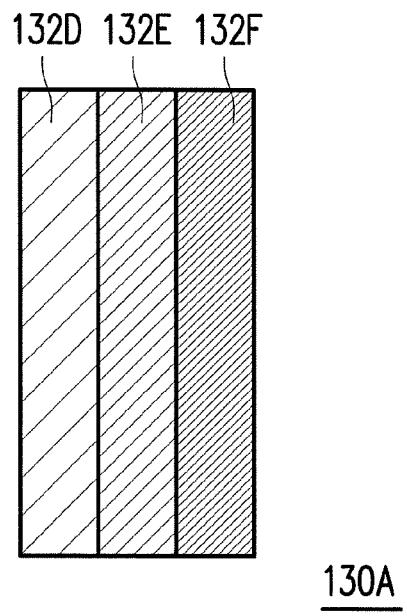
FIG. 4 is a top view illustrating a light separating structure according to a second embodiment of the disclosure.

FIG. 4 is a top view illustrating a light separating structure according to a second embodiment of the disclosure. Referring to FIG. 3 and FIG. 4, in the present embodiment, the positioning device 120A is not restricted to being arranged with the light separating structure 130 in the first embodiment above. The positioning device 120A may also be arranged with a light separating structure 130A, wherein each of the diffraction gratings 132D, 132E, 132F is arranged with different slit distances. Because the diffraction gratings 132D, 132E, 132F have different slit distances, the first diffraction fringe produced by the slits will also have different first diffraction angles, allowing the light penetrating the positioning device 120A to arrive at the sensing area 140 in different transmitting directions, and further allowing the distance between the first positioning optical patterns 142 illuminated on the sensing area 140 to increase, so as to facilitate the successive position measurements and determination.

Figure 5:
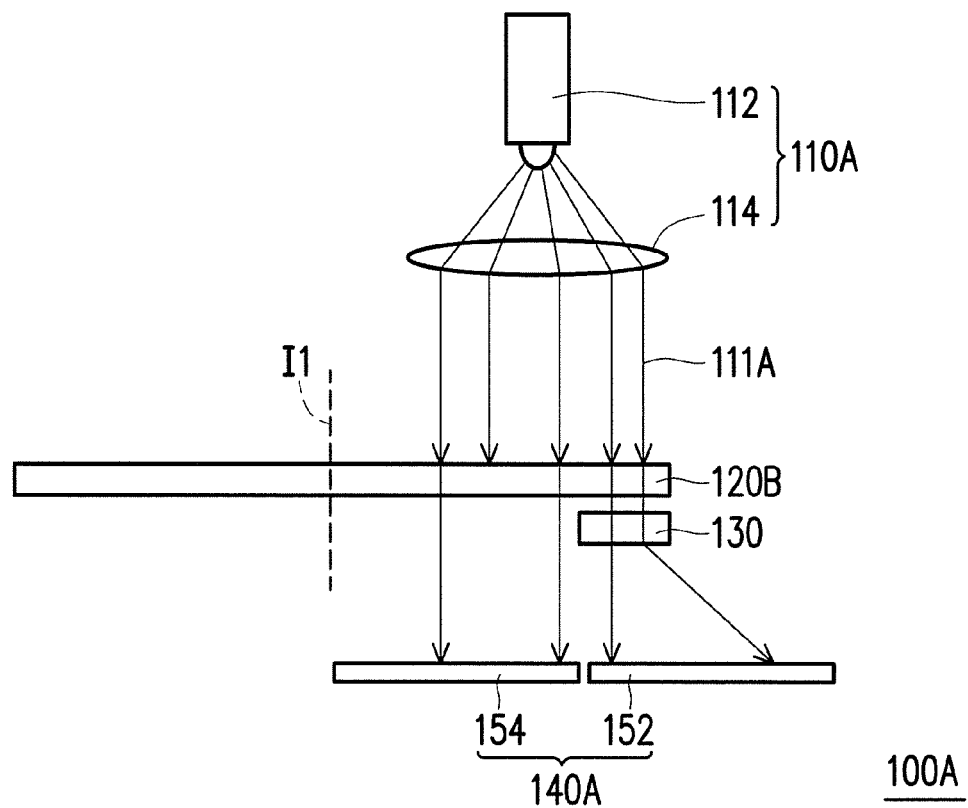
FIG. 5 is a schematic view illustrating an optical encoder according to a third embodiment of the disclosure.
Figure 6:
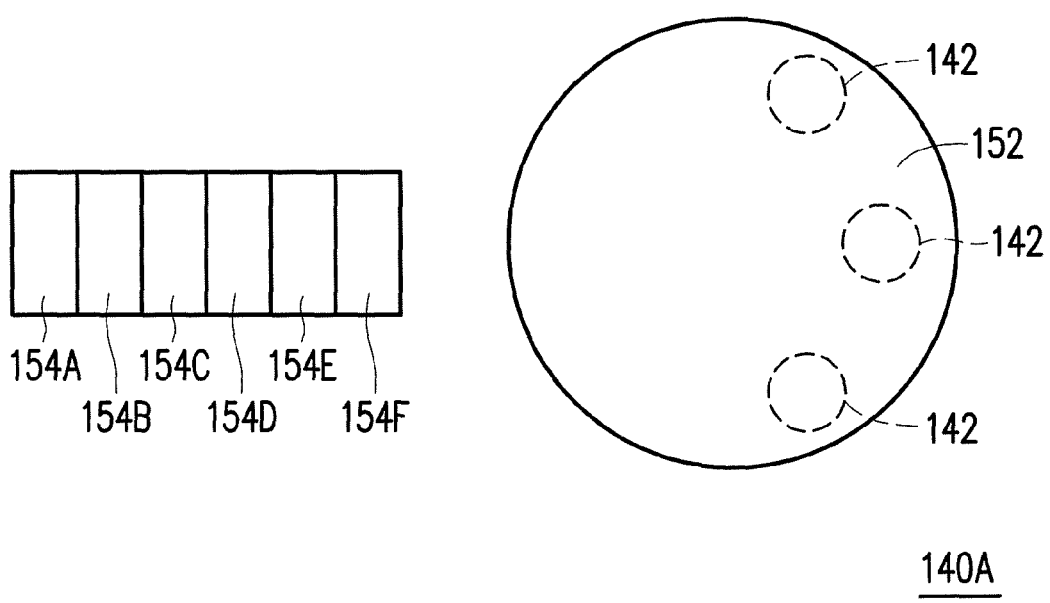
FIG. 6 is a top view illustrating a first sensing module and a second sensing module according to a third embodiment of the disclosure.
Figure 7:
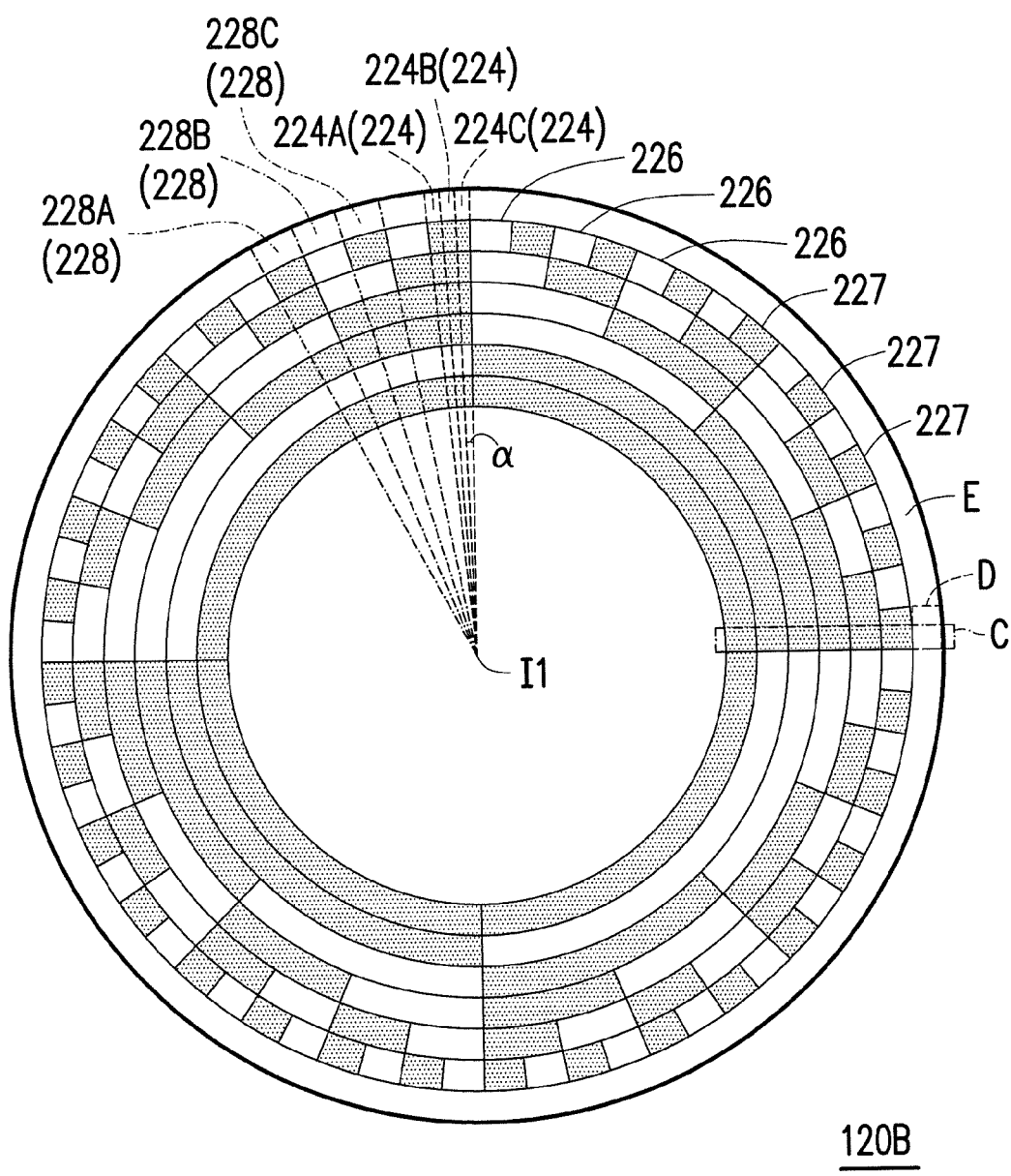
FIG. 7 is a top view illustrating a positioning device according to a third embodiment of the disclosure.

FIG. 5 is a schematic view illustrating an optical encoder according to a third embodiment of the disclosure. FIG. 6 is a top view illustrating a first sensing module and a second sensing module according to a third embodiment of the disclosure. FIG. 7 is a top view illustrating a positioning device according to a third embodiment of the disclosure. Referring to FIG. 5, in the third embodiment of the disclosure, a light emitting module 110A includes a light emitting unit 112 and a lens unit 114, and the light emitting unit 112 emits a light beam 111A transmitted to the lens unit 114, where the lens unit 114 makes the light beam 111A become a parallel light beam 111A. In the present embodiment, the light emitting module 110A uses the lens unit 114 formed by a single lens to form the parallel light, however it should not be construed as a limitation to the disclosure, and in other embodiments there may be a lens unit 114 formed by a lens set or other optical components to form a parallel light beam.

Referring to FIG. 7, in the third embodiment of the disclosure, a positioning device 120B rotates along an axis I1, the positioning areas (three positioning areas 224A, 224B, 224C are labelled here) are a plurality of fan shaped positioning areas 224, and the positioning device 120B separates the fan shaped positioning areas 224 according to an angle surrounding the axis I1. More specifically, the above fan shaped positioning areas 224 surround the axis I1, and the positioning device 120B separates the fan shaped positioning areas 224 according to a constant angle α surrounding the axis I1.

Referring to FIG. 7, in the present embodiment, the positioning device 120B includes a circular region E, and the circular region E of each fan shaped positioning area 224 is where a light penetrating area is disposed. In the present embodiment, the light separating structure 130 is disposed corresponding to an area D, and the area D overlaps a part of a light illumination area C and a part of the circular region E. Sub positioning areas (not labeled) in each fan shaped positioning area 224 are formed between the circular region E and the axis I1, and the sub positioning areas have a plurality of light penetrating patterns 226 and a plurality of light shielding patterns 227 formed in a dislocation manner with respect to each other extending along the direction of the circular path. The light penetrating patterns 226 and the light shielding patterns 227 divide the positioning device 120B into a plurality of areas like the areas 228 (three areas are labeled here, 228A, 228B, 228C). More specifically, the light penetrating patterns 226, for example, are arranged in a binary-coded decimal (BCD) method; however it should not be construed as a limitation to the disclosure. In other embodiments, the light penetrating patterns 226 may be arranged in gray code or other methods.

Referring to FIG. 5 to FIG. 7, in the third embodiment of the disclosure, the optical encoder 100A further includes a first sensing module 152 and a second sensing module 154. The first sensing module 152 is disposed in the sensing area 140A, and is configured to receive a part of the light beam 111A penetrating the light penetrating areas (Here for example area E). The second sensing module 154 is disposed in the sensing area 140A, and is configured to receive another part of the light beam 111A penetrating the light penetrating patterns 226. Referring to the top view shown in FIG. 6, the sensing surface of the first sensing module 152 configured to receive the part of the light beam 111A and the sensing surface of the second sensing module 154 configured to receive the another part of the light beam 111A are different. More specifically, the first sensing module 152 receives the part of the light beam 111A penetrating the area E of the positioning device 120B and transmitted to the sensing area 140A via the light separating structure 130, therefore the sensing surface of the first sensing module 152 needs to be designed to correspond to the first positioning optical pattern 142 produced by the light separating structure 130, and the second sensing module 154, for example, is designed according to the rotation path of the light penetrating patterns 226. That is to say, the arrangement of a photo detector on the sensing surface of the first sensing module 152 and the arrangement of a photo detector on the sensing surface of the second sensing module are different. For example, the photo detectors 154A-154F of the second sensing module are arranged along a straight line, and the photo detectors of the sensing surface of the first sensing module 152 for example are arranged radially according to the first positioning optical patterns 142.

As can be seen from the above, the optical encoder 100A may determine the position of the rotation with higher accuracy by the arrangement of the positioning device 120B, the light separating structure 130, the first sensing module 152 and the second sensing module 154. More specifically, the light beam 111A sensed by the second sensing module 154 may determine which area 228 the light illumination area C is located at. After determining the location on the area 228, according to the light beam 111A sensed by the first sensing module 152, which positioning area 224 of the areas 228 the light illumination area C is located in may be determined, providing a good positioning resolution, and at the same time, the manufacturing difficulty is lowered because the photo detectors on the sensing surface of the first sensing module 152 are arranged with a larger spacing.

In the embodiments of the disclosure, the above light penetrating areas and the light penetrating patterns (the sub positioning area) of the positioning device, for example, are formed as holes, and the positioning device is formed by a light opaque material, but however should not be construed as a limitation to the disclosure. The above positioning device may also be a light absorbing material or a reflective material arranged on a part of the surface of a transparent material, wherein the light penetrating areas and the light penetrating patterns (that is the sub positioning areas) may be formed on a part of the surface which does not have light absorbing material or reflective material arranged.

Figure 8A:
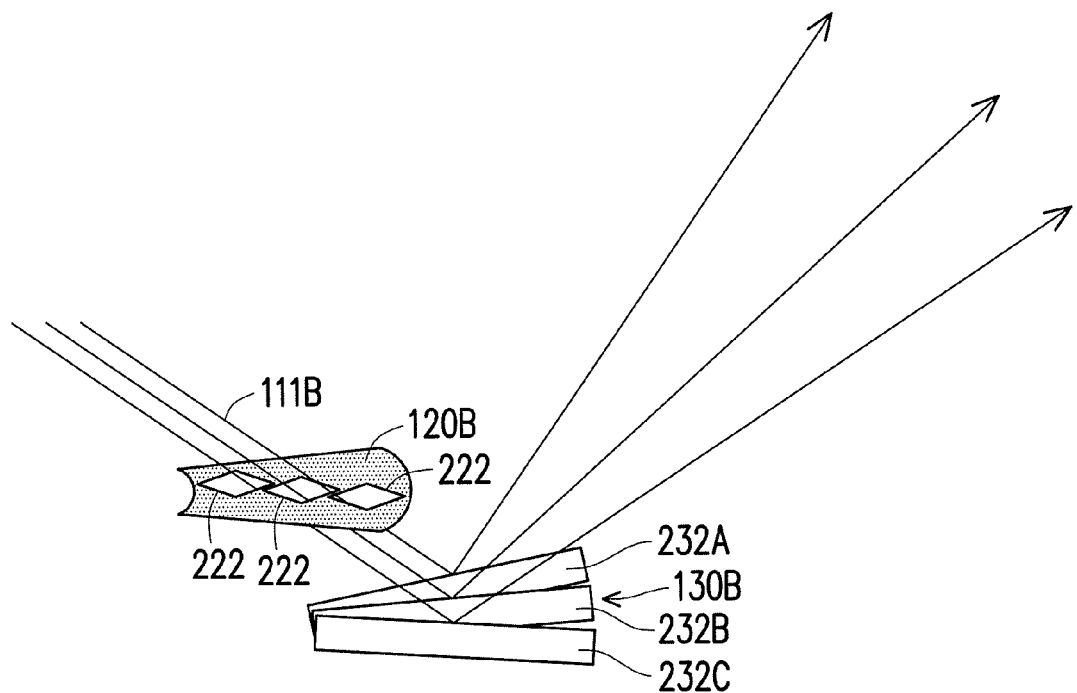
FIG. 8A is a partial schematic view of an optical encoder according to an embodiment of the disclosure.
Figure 8B:
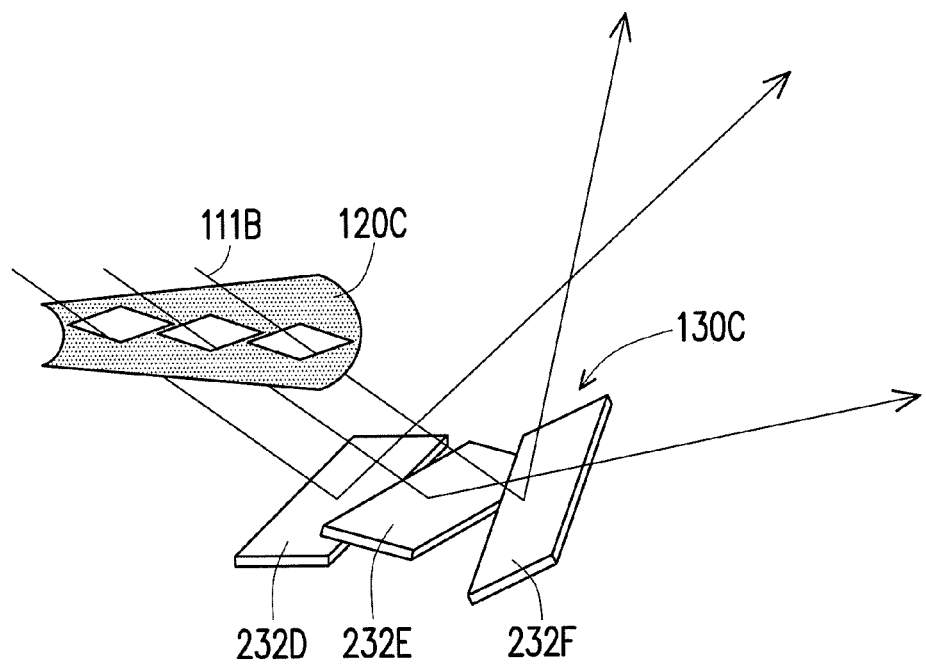
FIG. 8B is a partial schematic view of an optical encoder according to another embodiment of the disclosure.

FIG. 8A is a partial schematic view of an optical encoder according to an embodiment of the disclosure. FIG. 8B is a partial schematic view of an optical encoder according to another embodiment of the disclosure. Referring to FIG. 8A, in the embodiment of the disclosure, the make up of the light separating structure is not restricted to the above plurality of diffraction fringes, and also may be a light separating structure 130B formed by a plurality of micromirrors 232A, 232B, 232C. The size of the micromirrors 232A, 232B, 232C are larger than or equal to the size of the light penetrating areas 222 in the positioning device 120B, and the light beam 111B coming from the light emitting module have different incident angles with respect to the surfaces of the micromirrors 232A, 232B, 232C, making the light beam 111B penetrating the positioning device 120B be transmitted towards the sensing area at different directions, further increasing the distance between the first positioning optical patterns illuminated on the sensing area, so as to facilitate the successive position measurement and determination. In the present embodiment, the light separating structure 130B, for example, is a digital micromirror device (DMD).

The light separating structure formed by a plurality of digital micromirror devices (DMD) of the disclosure is not restricted to the above. Referring to FIG. 8B, in another embodiment of the disclosure, each of the micromirrors 232D, 232E, 232F of the light separating structure 130C faces different directions, allowing the light beam 111B penetrating the positioning device to be transmitted towards the sensing area at different directions, further increasing the distance between the first positioning optical patterns illuminating the sensing area, so as to facilitate the successive position measurement and determination.

In summary, the optical encoder provided by the embodiments of the disclosure uses a light separating structure to produce first positioning optical patterns, and the distance between the first positioning optical patterns produced by the light separating structure are larger, and therefore the positioning accuracy required for the successive arrangement of a sensing module may be lowered, enhancing the positioning quality of the assembly. Because the light separating structure may provide good first positioning optical patterns, the light penetrating areas of the positioning device in an optical encoder may be arranged in a method with even higher density, so as to enhance the positioning accuracy of the optical encoder.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical encoder, comprising:
   a light emitting module, emitting a light beam;
   a positioning device, the light beam illuminating an illumination area of the positioning device, the positioning device comprising:
      a plurality of light penetrating areas, arranged in a dislocation manner, the light penetrating areas sequentially moving into the illumination area; and
   a light separating structure, disposed in a transmitting path of the light beam, the positioning device being disposed between the light emitting module and the light separating structure, wherein when part of the light beam penetrates at least one of the light penetrating areas and is transmitted to the light separating structure, the light separating structure transmits the penetrating part of the light beam to a sensing area and forms at least one first positioning optical pattern, wherein a distance between two first positioning optical patterns formed by part of the light beam transmitted to the sensing area via two adjacent light penetrating areas is greater than a pitch between the two adjacent light penetrating areas.

2. The optical encoder as claimed in claim 1, wherein the positioning device further comprises a plurality of positioning areas, the positioning areas sequentially move into the illumination area, and each of the light penetrating areas is disposed on at least two adjacent positioning areas in the positioning areas, and parts of the positioning areas which two adjacent light penetrating areas are disposed on are different but partially the same.

3. The optical encoder as claimed in claim 2, wherein the number of the at least two positioning areas which each of the light penetrating areas is disposed on are the same.

4. The optical encoder as claimed in claim 2, wherein the positioning device rotates along an axis, the positioning areas are a plurality of fan shaped positioning areas, the positioning device is separated into the fan shaped positioning areas according to an angle surrounding the axis.

5. The optical encoder as claimed in claim 4, wherein the fan shaped positioning areas surround the axis.

6. The optical encoder as claimed in claim 4, wherein the positioning device is separated into the fan shaped positioning areas according to a constant angle surrounding the axis.

7. The optical encoder as claimed in claim 2, wherein each of the positioning areas further comprises a sub positioning area, the sub positioning areas form a plurality of light penetrating patterns and a plurality of light shielding patterns, the light penetrating patterns and the light shielding patterns respectively move to the illumination area along a plurality of paths, and the light penetrating patterns and the light shielding patterns are arranged in a dislocation manner with respect to each other along extending directions of the paths, and the light penetrating patterns and the light shielding patterns are arranged in a dislocation manner along a direction perpendicular to the paths, and part of the light penetrating the sub positioning areas forms a plurality of second positioning optical patterns directly on the sensing area, and the second positioning optical patterns are different from each other.

8. The optical encoder as claimed in claim 7, wherein arrangement of locations of appearance of the first positioning optical patterns is different from arrangement of locations of appearance of the above second positioning optical patterns.

9. The optical encoder as claimed in claim 7, further comprising:
  a first sensing module, disposed in the sensing area, the first sensing module being configured to receive a part of the light penetrating the light penetrating area; and
  a second sensing module, disposed in the sensing area, the second sensing module being configured to receive another part of the light penetrating the light penetrating patterns, wherein a sensing surface of the first sensing module configured to receive the part of the light and a sensing surface of the second sensing module configured to receive the another part of the light are different.

10. The optical encoder as claimed in claim 1, wherein the light penetrating areas have a same shape.

11. The optical encoder as claimed in claim 1, wherein the light penetrating areas are diamond shaped.

12. The optical encoder as claimed in claim 1, wherein the light separating structure comprises a plurality of light diffraction gratings, the light diffraction gratings each include a plurality of slits arranged in parallel, and a size of the light diffraction gratings are larger than or equal to a size of the light penetrating areas, and each of the light penetrating areas overlaps one of the diffraction gratings when moved, and two diffraction gratings overlapped by two adjacent light penetrating areas are different.

13. The optical encoder as claimed in claim 12, wherein each of the light diffraction gratings has the slits arranged in a different direction.

14. The optical encoder as claimed in claim 12, wherein each of the light diffraction gratings is arranged with a different slit distance.

15. The optical encoder as claimed in claim 12, wherein the first positioning optical patterns are formed by a first diffraction fringe diffracted by the diffraction gratings.

16. The optical encoder as claimed in claim 1, wherein the light separating structure is a plurality of micromirrors, and sizes of the micromirrors are larger than or equal to sizes of the light penetrating areas.

17. The optical encoder as claimed in claim 16, wherein each of the micromirrors faces a different direction.

18. The optical encoder as claimed in claim 16, wherein the light beam coming from the light emitting module has different incident angles with respect to surfaces of the micromirrors.

19. The optical encoder as claimed in claim 1, wherein the light beam emitted by the light emitting module is a parallel light beam.

20. The optical encoder as claimed in claim 19, wherein the light emitting module comprises a light emitting unit and a lens unit, and the light beam emitted by the light emitting unit is transmitted to the lens unit, and the lens unit makes the light beam become a parallel light beam.

* * * * *